July 24, 1962 H. S. JONES, JR 3,046,507
WAVEGUIDE COMPONENTS
Filed April 18, 1957

INVENTOR
HOWARD S. JONES, JR.

BY
*W. E. Thibodeau, J. P. Edgerton and T. J. Lynch*

United States Patent Office

3,046,507
Patented July 24, 1962

3,046,507
WAVEGUIDE COMPONENTS
Howard S. Jones, Jr., Washington, D.C., assignor to the United States of America as represented by the Secretary of the Army
Filed Apr. 18, 1957, Ser. No. 653,719
1 Claim. (Cl. 333—95)
(Granted under Title 35, U.S. Code (1952), sec. 266)

The invention described herein may be manufactured and used by or for the Government for governmental purposes without the payment to me of any royalty thereon.

This invention relates generally to waveguide assemblies and more particularly to waveguide components and methods of fabricating them.

Waveguide assemblies often require many types of waveguide components of various sizes and shapes. Short waveguide components and waveguide components having odd shapes are difficult and expensive to fabricate using conventional techniques because cross-sectional dimensions cannot be held within the tolerances necessary to attain a good impedance match. Waveguide components having an overall physical change such as a twist section, a transformer section or a transformer-twist section (which is a combination of a twist and a transformer) are examples of waveguide components which are difficult and expensive to fabricate using conventional methods.

One object of the present invention is to provide a new and inexpensive method of fabricating waveguide components.

Another object is to provide a method for easily and inexpensively fabricating very short waveguide components.

A further object is to provide several improved waveguide components.

The specific nature of the invention as well as other objects, uses and advantages thereof will clearly appear from the following description and from the accompanying drawing, in which.

Figure 1:
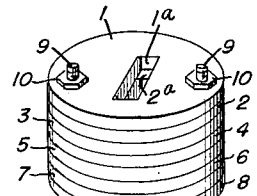
FIGURE 1 shows a waveguide twist section fabricated in accordance with the invention.
Figure 2:
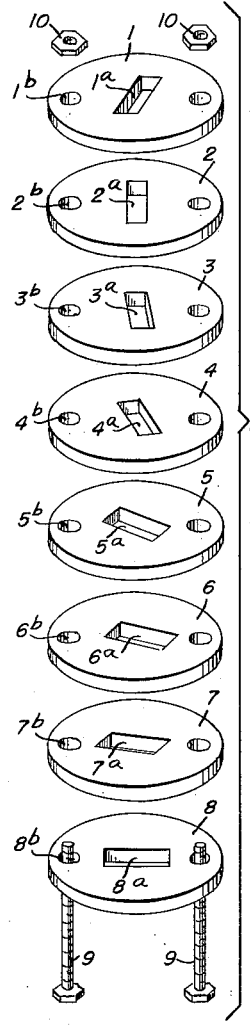
FIGURE 2 is an exploded view of the waveguide twist section shown in FIGURE 1.

Referring to FIGURES 1 and 2, an eighty-degree waveguide twist section is shown fabricated in accordance with the invention. As illustrated the twist section is made up of eight stacked plates 1, 2, 3, 4, 5, 6, 7, and 8 having waveguide slots 1a, 2a, 3a, 4a, 5a, 6a, 7a, and 8a located at the centers of plates 1—8, and guide holes 1b, 2b, 3b, 4b, 5b, 6b, 7b, and 8b located near the edges of plates 1—8. Plates 1—8 are fastened together by screws 9 passing through guide holes 1b—8b and secured by nuts 10 screwed on screws 9.

The eighty-degree twist is obtained in eight ten-degree steps; each of the eight plates 1—8 is one step in the overall rotation. Looking left to right in FIGURES 1 and 2 where plate 1 is on the left and plate 8 is on the right, the arrangement of the stacked plates 1—8 is as follows: Plate 2 is adjacent plates 1 and 3 and rotated so that slot 2a of plate 2 is ten degrees counterclockwise from slot 1a of plate 1; plate 3 is adjacent plates 2 and 4, and rotated so that slot 3a of plate 3 is ten-degrees counterclockwise from slot 2a of plate 2 and twenty degrees counterclockwise from slot 1a of plate 1; plate 4 is adjacent plates 3 and 5, and rotated so that slot 4a is ten-degrees counterclockwise from slot 3a of plate 3 and thirty degrees counterclockwise from slot 1a of slot 1; and so on until plate 8, plate 8 being placed adjacent plate 7, and rotated so that slot 8a is ten-degrees counterclockwise from slot 7a of plate 7 and eighty-degrees counterclockwise from slot 1a of plate 1. Guide holes 1b—8b through which screws 8 pass are placed so that plates 1—8 will be stacked in accordance with the above arrangement.

Figure 3:
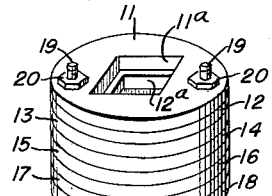
FIGURE 3 shows a waveguide transformer section fabricated in accordance with the invention.
Figure 4:
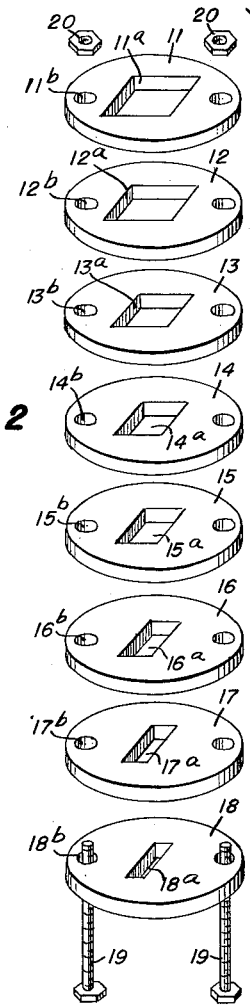
FIGURE 4 is an exploded view of the waveguide transformer section shown in FIGURE 3.

Another embodiment of the invention is shown in FIGURES 3 and 4 illustrating a waveguide transformer section which transforms the width of a slot from full size to half-size. The transformer section is made up of eight-stacked plates 11, 12, 13, 14, 15, 16, 17, and 18 having waveguide slots 11a, 12a, 13a, 14a, 15a, 16a, 17a, and 18a located at the centers of plates 11—18 and guide holes 11b, 12b, 13b, 14b, 15b, 16b, 17b, and 18b located near the edges of plates 11—18. Plates 11—18 are fastened together by screws 19 passing through guide holes 11b—18b and secured by nuts 20 screwed on screws 19.

The change in the width of the slot of the transformer section from full-width to half width is obtained in eight steps, each of the eight plates 11—18 is a one-eighth step in the overall change in slot width. The arrangement of the stacked plates 11—18 is as follows: Plate 12 is adjacent plates 11 and 13, slot 12a in the center of plate 12 being fifteen-sixteenths as wide as slot 11a in the center of plate 11; plate 13 is adjacent plates 12 and 14, slot 13a in the center of plate 13 being seven-eighths as wide as slot 11a in the center of plate 11; plate 14 being thirteen-sixteenths as wide as slot 11a in the center of plate 11; and so on until plate 18, plate 18 being adjacent plate 17, slot 18a in the center of plate 18 being one-half as wide as slot 11a in the center of plate 11. Guide holes 11b—18b through which screws 19 pass are placed so that plates 11a—18a in plates 11—18 will be concentric.

Figure 5:
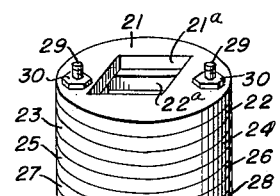
FIGURE 5 is a waveguide transformer-twist section fabricated in accordance with the invention.
Figure 6:
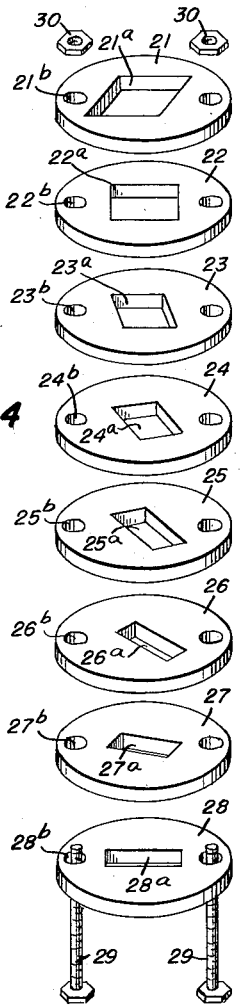
FIGURE 6 is an exploded view of the waveguide transformer-twist section shown in FIGURE 5.

The use of the invention to fabricate a waveguide component having a more complicated overall physical change is shown in FIGURES 5 and 6. FIGURES 5 and 6 illustrate a transformer-twist section which combines in a single waveguide component, a twist of eighty degrees and a transformation of slot width from full-width to half-width. The transformer-twist section is made up of eight stacked plates 21, 22, 23, 24, 25, 26, 27, and 28 having waveguide slots 21a, 22a, 23a, 24a, 25a, 26a, 27a, and 28a located at the centers of plates 21—28, and guide holes 21b, 22b, 23b, 24b, 25b, and 26b located near the edges of plates 21—28.

The eighty-degree twist and the change in slot width of the transformer-twist section are obtained in eight steps, each of the eight plates 21—28 is a one-eighth step in the overall physical change. Looking left to right in FIGURES 5 and 6 where plate 21 is on the left and plate 28 is on the right, the arrangement of the stacked plates 21—28 is as follows: Plate 22 is adjacent plates 21 and 23 and rotated so that slot 22a in the center of plate 22 is ten-degrees counterclockwise from slot 21a in the center of plate 21, slot 22a being fifteen-sixteenths as wide as slot 21a; plate 23 is adjacent plates 22 and 24 and rotated so that slot 23a in the center of plate 23 is twenty degrees counterclockwise from slot 21a in the center of plate 21, slot 23a being seven-eighths as wide as slot 21a; plate 24 is adjacent plates 23 and 25 and rotated so that slot 24a in the center of plate 24 is thirty-degrees counterclockwise from slot 21a in the center of plate 21, slot 24a being thirteen-sixteenths as wide as slot 21a; and so on until plate 28, plate 28 being adjacent plate 27 and rotated so that slot 28a in the center of plate 28 is eighty-degrees counterclockwise from slot 21a in the center of plate 21, slot 28a being one-half as wide as slot 21a.

Guide holes 21b—28b through which screws 29 pass are placed so that the plates 21—28 will be stacked in accordance with the above arrangement.

It will be apparent that the embodiments shown are only exemplary and that various modifications can be made in construction and arrangement within the scope of the invention as defined in the appended claim.

I claim:

A waveguide section comprising in combination: a cylindrical stack of circular plates, said stack consisting of a first and last plate and a series of plates concentrically stacked therebetween, one face of each plate contacting the face of an adjacent plate in said stack, guide holes through each plate adjacent the periphery thereof, means passing through said guide holes for fastening said plates together, a rectangular waveguide slot formed in the center of each plate of said stack, each slot in each plate decreasing progressively in width from said first to said last plate of said stack, each slot being rotated with respect to the slot in the preceding plate of said stack so that a continuous twisted slot of decreasing width through said stack is formed.

References Cited in the file of this patent

UNITED STATES PATENTS

| | | |
|---|---|---|
| 2,438,915 | Hansen | Apr. 6, 1948 |
| 2,514,779 | Martin | July 11, 1950 |
| 2,529,381 | Frear | Nov. 7, 1950 |
| 2,531,437 | Johnson et al. | Nov. 28, 1950 |
| 2,555,118 | Coyle | May 29, 1951 |
| 2,617,937 | Van Atta | Nov. 11, 1952 |

OTHER REFERENCES

Markus: "Production Techniques," Electronics Magazine, December 1956, pages 228, 230.